United States Patent
Santos (10) Patent No.: US 8,717,879 B2
(45) Date of Patent: May 6, 2014

(54) METHOD TO BE RUN IN AND DEVICE OF A NETWORK AS WELL AS COMMUNICATION SYSTEM COMPRISING SUCH DEVICE

(75) Inventor: Jose Santos, Lisbon (PT)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 12/672,545

(22) PCT Filed: Aug. 4, 2008

(86) PCT No.: PCT/EP2008/060245
§ 371 (c)(1),
(2), (4) Date: Nov. 5, 2010

(87) PCT Pub. No.: WO2009/019257
PCT Pub. Date: Feb. 12, 2009

(65) Prior Publication Data
US 2011/0317549 A1    Dec. 29, 2011

(30) Foreign Application Priority Data
Aug. 7, 2007    (EP) ..................................... 07015526

(51) Int. Cl.
*H04L 12/24*    (2006.01)

(52) U.S. Cl.
USPC ........... 370/225; 370/216; 370/222; 370/242; 370/248; 370/404; 714/17

(58) Field of Classification Search
USPC ......... 370/222–224, 241, 460, 355, 389, 404, 370/248; 398/3–4; 714/717; 375/537
See application file for complete search history.

(56) References Cited

U.S. PATENT DOCUMENTS

| | | | |
|---|---|---|---|
| 5,278,824 A | | 1/1994 | Kremer |
| 5,282,200 A | * | 1/1994 | Dempsey et al. ............. 370/245 |
| 5,307,353 A | | 4/1994 | Yamashita et al. |
| 5,499,275 A | * | 3/1996 | Kishi ............................ 375/357 |
| 6,046,833 A | | 4/2000 | Sharma et al. |
| 6,430,151 B1 | | 8/2002 | Glas et al. |
| 7,003,705 B1 | * | 2/2006 | Yip et al. ...................... 714/717 |
| 7,200,109 B2 | | 4/2007 | Semaan |

(Continued)

FOREIGN PATENT DOCUMENTS

| EP | 0573217 A2 | 12/1993 |
|---|---|---|
| EP | 1062787 A1 | 12/2000 |
| EP | 1998503 A1 | 12/2008 |

OTHER PUBLICATIONS

IETF RFC 3619 Shah, S.; Yip, M.; Extreme Networks' Ethernet Automatic Protection Switching (EAPS) Version 1; Oct. 2003.

*Primary Examiner* — Michael Thier
*Assistant Examiner* — Vincelas Louis
(74) *Attorney, Agent, or Firm* — Laurence A. Greenberg; Werner H. Stemer; Ralph E. Locher (57) ABSTRACT

A method and a device are provided to be run in a network (or in particular on a network component of such network). The network has several network elements that are connected via a ring. One network element is a ring master with a primary port and a secondary port. The novel process includes the steps of (i) a failure along one direction of the ring is detected by the ring master; and (ii) the ring master sends a first message via its port that indicates the direction of the failure.

18 Claims, 5 Drawing Sheets

(56) References Cited

U.S. PATENT DOCUMENTS

| | | |
|---|---|---|
| 7,440,397 B2 * | 10/2008 | Tsurumi et al. ............... 370/222 |
| 7,944,815 B2 * | 5/2011 | Thomson et al. ............. 370/222 |
| 2003/0133444 A1 * | 7/2003 | Wakamatsu et al. .......... 370/355 |
| 2004/0008721 A1 * | 1/2004 | Ying et al. .................... 370/460 |
| 2004/0213564 A1 | 10/2004 | Sakano et al. |
| 2004/0223503 A1 * | 11/2004 | Lynch et al. .................. 370/404 |
| 2005/0111372 A1 * | 5/2005 | Koestner et al. .............. 370/248 |
| 2005/0201275 A1 * | 9/2005 | Ying et al. .................... 370/222 |
| 2005/0207348 A1 * | 9/2005 | Tsurumi et al. ............... 370/241 |
| 2005/0243823 A1 * | 11/2005 | Griswold et al. ............. 370/389 |
| 2006/0250969 A1 * | 11/2006 | Florit et al. ................... 370/241 |
| 2007/0165517 A1 * | 7/2007 | Binetti et al. ................. 370/222 |

* cited by examiner

METHOD TO BE RUN IN AND DEVICE OF A NETWORK AS WELL AS COMMUNICATION SYSTEM COMPRISING SUCH DEVICE

BACKGROUND OF THE INVENTION

Field of the Invention

The invention relates to a method to be run in and a device of a network as well as to a communication system comprising such device.

An Ethernet Ring Protection (ERP) mechanism and protocol are disclosed in, e.g., EP 1 062 787 B1. In addition, there exists another ring protection mechanism called Ethernet Automatic Protection Switching (EAPS) as described in, e.g., IETF RRC3619.

Such ring protection mechanisms comprise a ring master RM (also referred to as a redundancy manager) to coordinate ring protection activities.

Protection in this sense means in particular that a link-layer loop in a physical Ethernet is avoided. The ring master is equipped to prevent the ring from forming such Ethernet loops.

When the ring master is notified that the ring is healthy (e.g., via test packets that are sent by the ring master via both of its ports), i.e. all ring nodes (network elements) and links (segments or arcs) are operational, the ring master breaks the link-layer loop by blocking traffic reception and transmission at one of its ring ports (the ring master's secondary port).

All traffic is blocked at that secondary port except for Ethernet ring protection control traffic, e.g., test packets. Preferably, such control traffic is sent via a control virtual LAN (VLAN).

From a link-layer's perspective, blocking traffic at the ring master's secondary port transforms the ring's topology into a chain of nodes (network elements). This is necessary in typical layer 2 (L2) networks (see also document IEEE 802.1 for further explanation). The ring master blocking its secondary port resulting in a topology of a chain of network elements is considered a normal operational state of the Ethernet Ring Protection mechanism.

Figure 1:
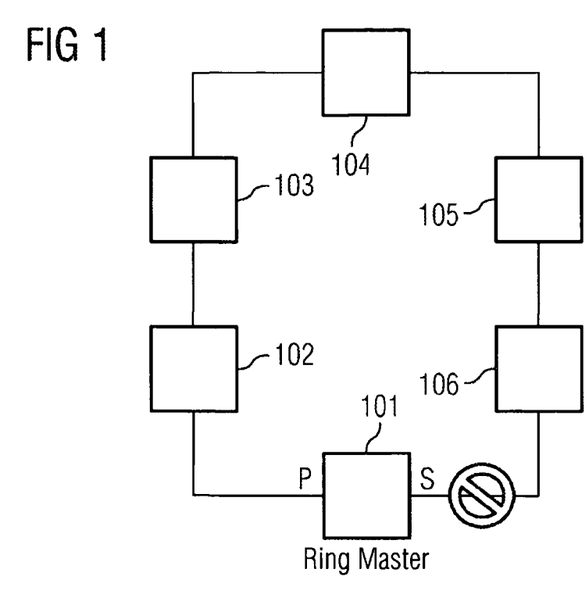
FIG. 1 shows an Ethernet Ring Protection (ERP) structure.

FIG. 1 shows such an ERP structure. The ring comprises network elements or nodes 101 to 106, wherein the node 101 is a Ring Master RM (also referred to as redundancy manager) with a primary port P and a secondary port S. As stated before, in normal operation, the Ring Master blocks its secondary port S resulting in the nodes 101 to 106 building a chain topology for the user traffic.

Link or Port Failure:

When a failure emerges in the ring, e.g., a link failure of a ring segment, the Ring Master unblocks its secondary port S thereby reestablishing communication between all ring nodes.

Figure 2:
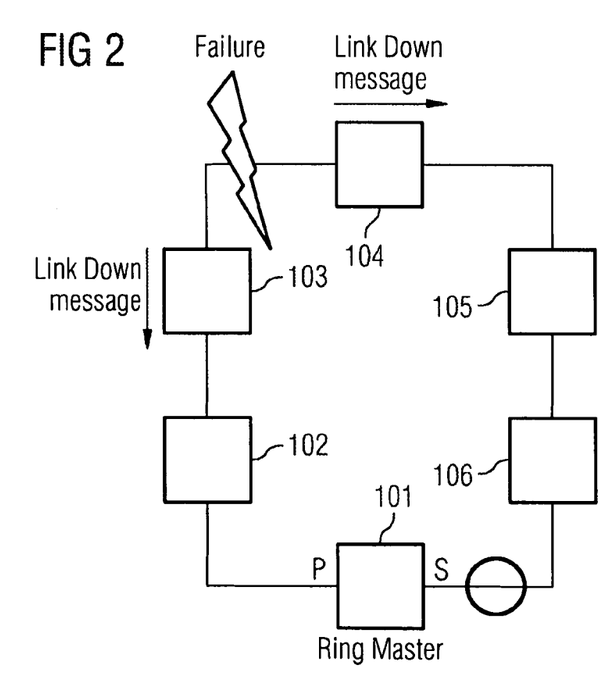
FIG. 2 shows an ERP structure in which a failure has occurred.

The failure can be directly detected by the Ring Master itself if the failure occurs at one of its ports. Alternatively, the Ring Master can be notified by another network element of the ring about a failure detected at one of the network element's ports. In such case, the affected network element sends a Link Down message to the Ring Master. The Ring Master subsequently unblocks its secondary port S (see FIG. 2).

Failure Recovery:

When a network element of the ring detects that a failure recovered, it sends a notification to the Ring Master indicating that the link or port is operative again. This can be achieved by the network element sending a Link Up message to the Ring Master. The network element will switch over to a pre-forwarding state blocking all traffic except test packets (health-check messages conveyed via the VLAN). In this pre-forwarding state the network element waits for a message from the Ring Master to switch over to normal operation (or forwarding state) again.

The Ring Master blocks the secondary port S again and sends the message to the network element to get back to normal operation. The Ring Master allows the network element to migrate from its pre-forwarding state to normal operation (forwarding state) only after the Ring Master blocked its secondary port S. This avoids configuration of a link-layer loop.

Preferably, the Ring Master assesses the operational state of the whole ring by frequently sending heath-check packets via both of its ring interfaces, i.e. via its primary port P and its secondary port S. These health-check packets (also referred to as test packets) may be conveyed via a control VLAN. If the ring is operational, the Ring Master receives its test packets sent via the respective other interface. If the test packets are not received, the ring may be broken and protection recovery actions should be initiated.

It is disadvantageous that according to a non fatal error test packets may be lost in just one direction. This leads to a partially defective traffic, i.e. a portion of the traffic may get lost whereas another portion may still arrive at its destination.

BRIEF SUMMARY OF THE INVENTION

The object to be solved is to avoid the disadvantages stated before and to provide an approach that handles a link that is defective in only one direction, but operative in the other direction.

This problem is solved according to the features of the independent claims. Further embodiments result from the depending claims.

In order to overcome this problem a method is provided to be run in a network (or in particular on a network component of such network). The network comprises several network elements that are connected via a ring, wherein one network element is a ring master comprising a primary port and a secondary port. The method comprises the steps:

a failure along one direction of the ring is detected by the ring master;

the ring master sends a first message via its port that indicates the direction of the failure.

In particular, the ring master allows the failure in the ring to be detected, said failure happens only in one direction along the path, but not in the other direction. The ring master acts on such detection by sending the first message via the port (its primary port or secondary port) that points towards the failure or indicates the direction of the failure.

In an embodiment, the failure is detected by the ring master via an at least one second message that is not arriving at (at least) one of its port.

Due to the fact that only one second message does not reach the port, but the other does reach the opposite port, the ring master determines that the communication path is corrupt in one direction only.

In another embodiment, the at least one second message is a test message and/or a health check message. Such at least one second message may be conveyed as a data packet.

In a further embodiment, the at least one second message is sent by the ring master. Also, the at least one second message may be sent by the ring master via its primary port and via its secondary port.

Advantageously, such at least one second message sent via one of the ring master's ports travels through the ring network and arrives at the ring master's opposite port. Receiving, e.g., the at least one second message at the ring master's secondary port, the ring master may recognize that it has been generated by itself and sent via its primary port. Hence, the communication path from the primary port to the secondary port (through the ring network) is operative. The same mechanism may be applied in the opposite direction from the secondary port to the primary port thereby indicating whether or not this particular direction through the ring network is defective.

In yet another embodiment, the at least one second message is sent via a control virtual local area network (control VLAN).

Such control VLAN may be operative in both directions through the ring and is advantageously administered by the ring master. This, however, is different from user traffic that—in normal operation, i.e. without a failure in the ring network—may not be conveyed via the secondary port of the ring master (which, as stated above, is blocked in normal operation).

In a next embodiment, the first message is sent by the ring master via the port that did not receive the at least one second message.

Hence, in the case of an unidirectional failure within the ring network, the at least one second message may not arrive at one of the ring master's ports. This port is chosen for dispatching the first message into the ring network.

The first message may in particular be a message that advises a recipient to block an interface upon certain conditions.

In an embodiment, the method comprises the following steps:
- a network element receiving the first message forwards the first message if the at least one second message does not arrive at both of its ports;
- a network element receiving the first message enters a predefined state if the at least one second message arrives at both of its ports.

Hence, receiving the first message, the network element determines whether or not the at least one second message (e.g., test message) arrives at both of its ports. If this is the case, this particular network element is not the last one that received the at least one second message at both of its ports. Therefore, the first message is forwarded to the next network element along the direction as specified by the ring master.

Thus, one network element after the other runs this mechanism and forwards the first message along the given direction (from the ring master via its port that did not receive the at least one second message, e.g., test packet) until the network element is found that received the second message at both of its ports. This network element hence is the last network element that received the at least one second message at both sides (ports). The link failure is between this network element identified and the one that at last dispatched the first message.

Accordingly, this network element enters the predefined state.

It is an embodiment that in the predefined state the network element blocks the port at which the first message has been received.

Preferably, the predefined state may be a pre-forwarding state.

In yet another embodiment, the network element that enters the predefined state sends a third message to the ring master. This third message may be an acknowledge message to the first message.

In an embodiment, the third message is sent via the path without the failure.

Furthermore, upon receipt of the third message, the ring master may unblock its secondary port.

Hence, the ring master becomes aware that according to its first message sent a network element entered a pre-forwarding state and sends via the third message an acknowledge to this first message. Pursuant to receiving the third message the ring master knows that a port of a network element has been blocked and thus the ring master may unblock its secondary port to keep up the traffic flow within the ring network.

In another embodiment, the method comprises the following steps:
- the ring master detects the at least second message at its secondary port and at its primary port;
- the ring master blocks its secondary port;
- the ring master sends a forth message to the network element that has entered the predefined state.

This allows the ring master to switch to normal operation mode, i.e. to block its secondary port, once the ring master becomes aware of the at least one second messages arriving (again) at both of its ports. Hence, the one directional link failure is corrected, the ring master gets back to normal operation and sends the forth message toward the network element that entered the predefined (e.g., pre-forwarding) state.

As another embodiment, the network element that is in the predefined state unblocks its port upon reception of the forth message. In particular, the network element that is in the predefined state may enter a forwarding state.

In yet a further embodiment, the network element that switched back to the forwarding state (subsequently) informs the ring master of its state change by sending a respective message to the ring master.

Thus, the ring master may already have blocked its secondary port and informed the network element in the predefined state to switch to normal operation, i.e. to unblock its previously blocked port and switch to the forwarding state. After the affected network element acted accordingly, the ring master is informed that this network element is back to normal operation. Hence, the ring network is fully operative in normal state (again) as it was prior to any failure detected by the ring master.

The problem as stated supra is also solved by a device comprising a processor unit that is arranged and/or equipped such that the method as described herein can be run and/or executed on said processor.

The device may in particular be a communication device, e.g., a network element or a ring master.

The problem as stated supra is further solved by a communication system comprising the device as described herein.

Embodiments of the invention are shown and illustrated in the following figures:

DESCRIPTION OF THE INVENTION

The approach described herein preferably is based upon a link failure in one direction only, i.e. a communication channel can transfer data from A to B, but not vice versa.

The example described hereinafter uses in particular the following mapping to the messages as described supra:

a) The first message as described corresponds to a block interface message (BI) sent by a ring master RM indicating that a network element has to block a particular port.

b) The at least one second message as described corresponds to a test message (or health check message). Test messages are preferably sent by the ring master RM via its primary port and via its secondary port. The test messages are (in normal operation without a failure in the ring network) received by the respective other port of the ring master thereby informing the ring master that the ring is operational (in both directions). The test messages are preferably sent via a control VLAN of the ring network.

c) The third message is an acknowledge message to the first message, preferably a block interface acknowledge message (BI_ack).

d) The forth message is a message sent by the ring master telling a particular network element of the ring network to unblock its port and switch to normal operation (i.e. a forwarding state). This forth message is further referred to as unblock interface message (UI).

e) In addition, there is a further message sent by the network element that received the unblock interface message and entered the forwarding state thereby sending an unblock interface acknowledge message (UI_ack) to the ring master.

The block interface message, the block interface acknowledge message, the unblock interface message and the unblock interface acknowledge message are preferably conveyed via an Ethernet slow protocol.

FIG. 3 to FIG. 8 show an example as how the approach presented herein may operate. These figures show a ring network comprising network elements (or nodes) 301 to 306, wherein the network element 301 is the ring master RM (also referred to as a redundancy manager). As far as ring protection is concerned, the ring network may run an Ethernet Ring Protection (ERP) protocol or an Ethernet Automatic Protection Switching (EAPS) protocol.

Figure 3:
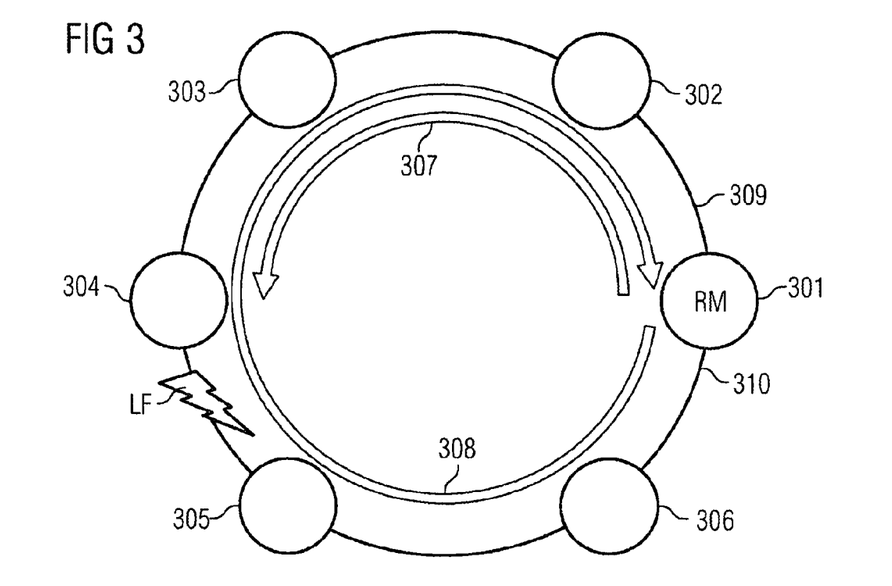
FIG. 3 shows an ring network with an unidirectional link failure that is detected by a ring master.

In FIG. 3, a link failure LF occurs at a connection between the network element 304 and the network element 305, wherein the failure only affects one direction of the connection, i.e. traffic may pass from the network element 305 to the network element 304, but not vice versa. The ring master 301 on a regular basis dispatches test messages via both of its ports 309 and 310.

Due to the link failure LF, test messages 307 sent via port 309 are interrupted, but test messages 308 sent via port 310 get back to port 309 of the ring master 301 thereby indicating that there is a unidirectional link failure somewhere within the ring network.

Figure 4:
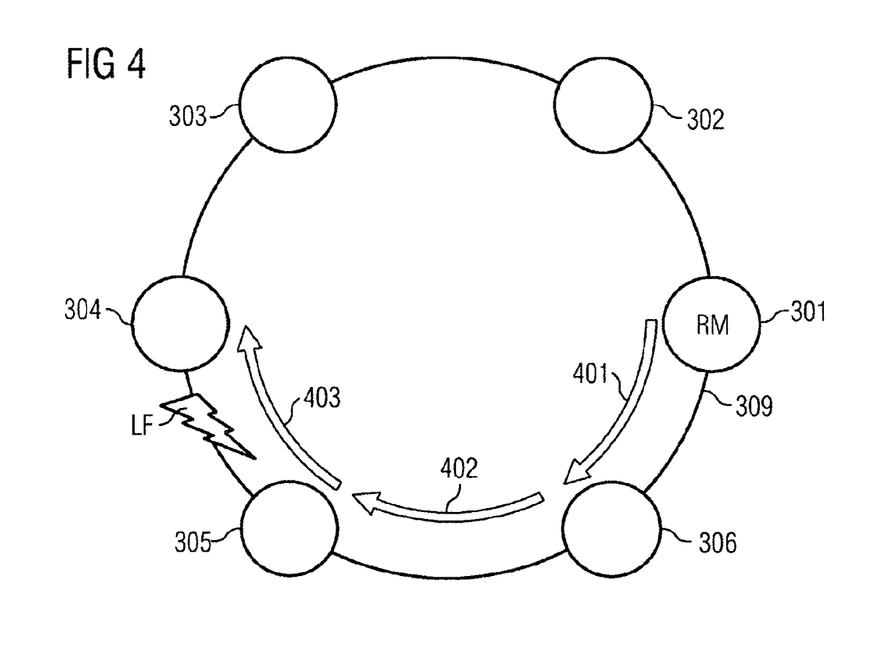
FIG. 4 shows the ring network of FIG. 3, wherein "block interface"-messages initiated by the ring master are sent towards the network element of the ring network that is adjacent to the unidirectional link failure.

Hence, as shown in FIG. 4, the ring master 301 sends the block interface message 401 via its port 310 that did not receive the test message. The block interface message 401 is received at the network element 306.

Next, the network element 306 evaluates whether test messages have been received at both of its ports. According to this example and as can be seen in FIG. 3, the network element 306 only received test messages 308 at one of its ports, the test messages 307 cannot reach this network element 306 due to the unidirectional link failure LF.

As test messages did not arrive at both ports of network element 306, this network element 306 forwards the block interface message 402 to the network element 305.

With regard to the network element 305 only one of its ports received test messages (i.e. test messages 308 sent via port 310 of the ring master 301). Thus, the network element 305 forwards the block interface message 403 to the network element 304.

As the link failure LF is unidirectional from the network element 304 to the network element 305 only, the block interface message 403 arrives at the network element 304.

The network element 304 is the last one in the test message path 307 that received test messages at both of its ports. Hence, the network element 304 enters a pre-forwarding state and blocks (see reference 502 in FIG. 5) its port pointing towards the link failure, the direction receiving the block interface message. It is to be noted that the blocked interface 502 still may receive test messages via, e.g., a control VLAN.

Figure 5:
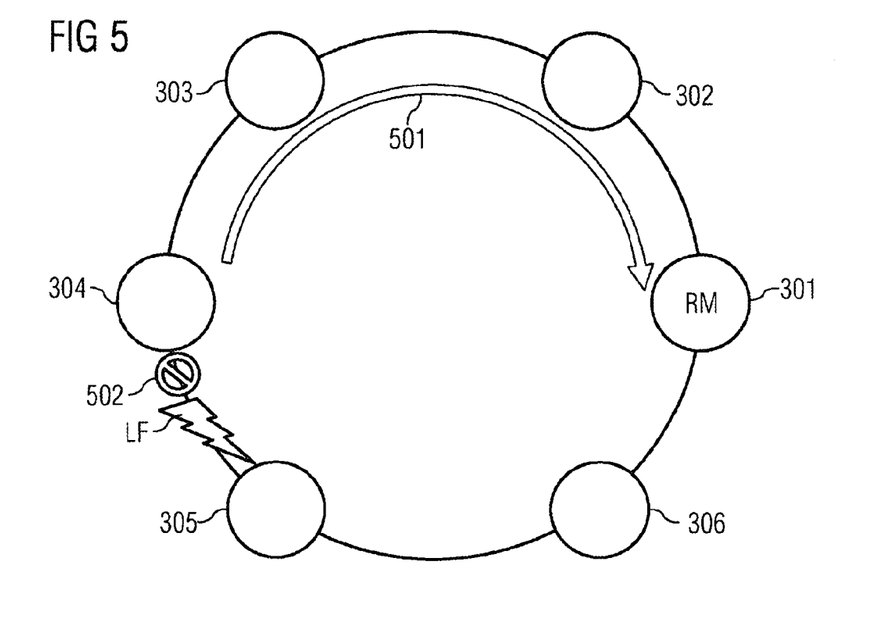
FIG. 5 shows the ring network of FIG. 4, wherein the network element that entered a pre-forwarding state sends a "block interface acknowledge"-message to the ring master via the healthy path.

In addition, the network element 304 sends a block interface acknowledge message 501 to the ring master 301 via the path without link failure.

Upon reception of the block interface acknowledge message 501, the ring master 301 unblocks its secondary port thereby restoring connectivity of the ring network.

Figure 6:
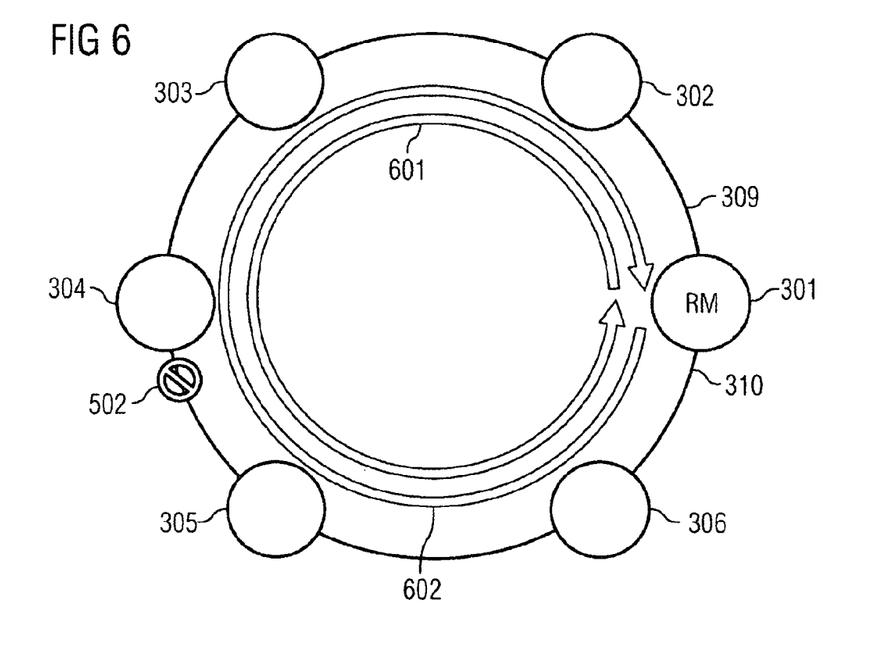
FIG. 6 shows the ring network of FIG. 5, wherein the link failure is corrected and the test messages are no longer interrupted.

FIG. 6 shows that the link failure LF has been corrected, test messages 601 and 602 arrive at both ports of the ring master 301. The ring master 301 blocks its secondary port to avoid a loop within the ring network.

However, due to the link failure LF, the network element 304 still is in the pre-forwarding state and the its port 502 still is blocked.

Figure 7:
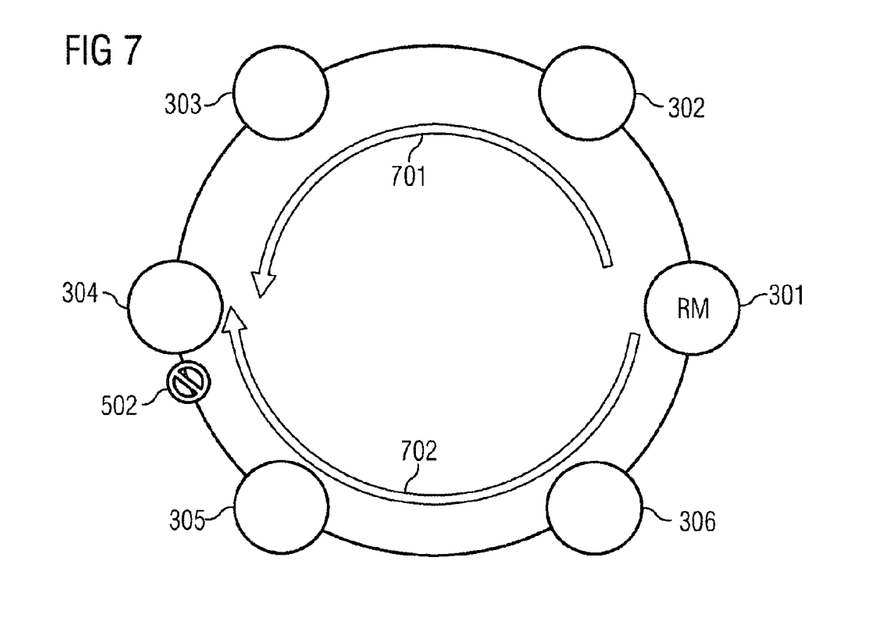
FIG. 7 shows the ring network of FIG. 6, wherein due to the healthy ring the ring master blocks its secondary port and sends "unblock interface"-messages to the network element that still is in the pre-forwarding state.

As shown in FIG. 7, the ring master 301 sends—via both of its ports 309 and 310—unblock interface messages 701 and 702 to the network element 304.

Figure 8:
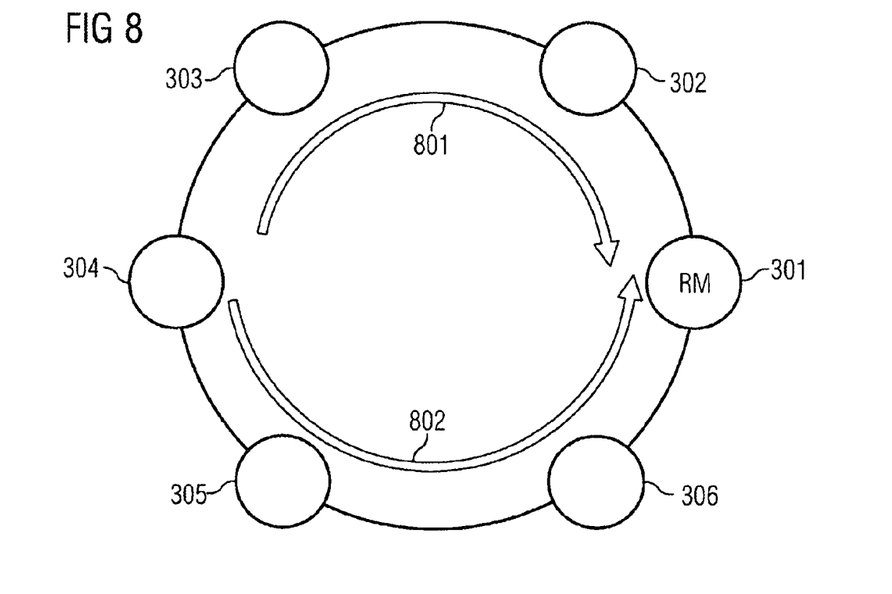
FIG. 8 shows the ring network of FIG. 7, wherein the network element that has been in the pre-forwarding state switches to a forwarding state and sends "unblock interface acknowledge"-messages to the ring master.

Upon receipt of the unblock interface messages 701 and 702 at both of its ports, the network element 304 unblocks its interface 502 and switches from the pre-forwarding state to a forwarding state. In addition, the network element 304 sends unblocking interface acknowledge messages 801 and 802 via both of its ports to the ring master 301 (as shown in FIG. 8).

It is to be noted that each message may be sent more than once, in particular in order to avoid any errors due to lost data packets.

It is further to be noted that the link failure may happen on a shared link. In such case, just one ring master may detect the failure and may provide the measures as described herein.

It is an advantage of this approach that unidirectional link failures within a network may be detected and correctly removed from layer 2 paths. Temporary loops within the ring network are avoided.

Figure 9:
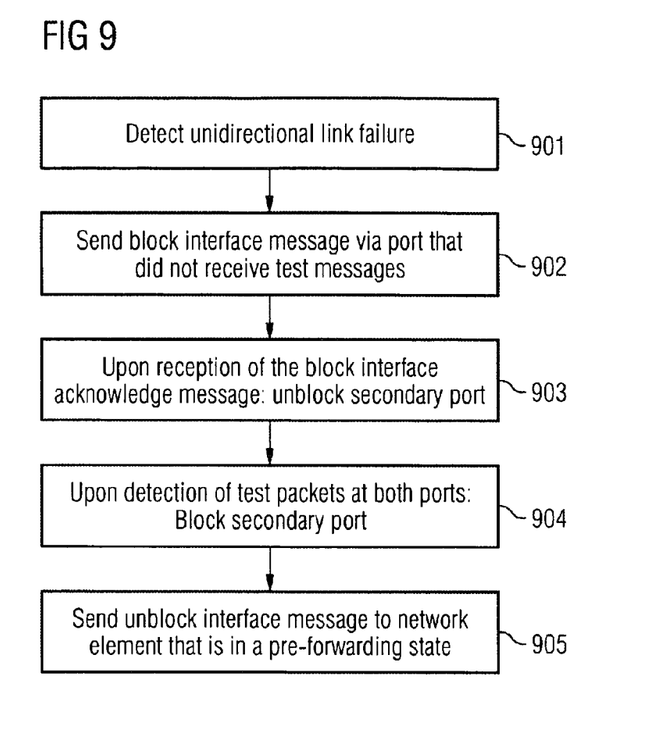
FIG. 9 shows a float diagram comprising steps to be run and/or executed on a ring master of a ring network.

FIG. 9 shows a float diagram comprising steps to be run and/or executed on a ring master of a ring network. In a step 901 the ring master detects an unidirectional link failure and sends in a step 902 a block interface message via its port that did not receive test messages due to the unidirectional link failure. Upon reception of a block interface acknowledge message the ring master in a step 903 unblocks its secondary port to keep up traffic flow throughout the ring network. Upon detection of test packets arriving at both of its ports (again), the ring master in a step 904 blocks the secondary port and (in a step 905) sends unblock interface messages to the network element that is in a pre-forwarding state.

The invention claimed is:

1. A method of handling a failure in a network, the network comprising at least two network elements, the network elements each including at least two ports furnished for bidirectional communications, and the network elements interconnected via these at least two ports to form a ring network, wherein information can be sent both ways along the ring, and, wherein one of the network elements is a ring master, the ring master having blocked one of its ports connected in the ring for reception and transmission of all traffic except for ring protection control traffic, the method comprising the steps of:
    sending, by the ring master, test messages across the ring in both directions via its two ports connected in the ring, the test messages each traveling through the ring and being received at the ring master's respective opposite port;
    detecting, by the ring master, a unidirectional link failure somewhere within the ring network due to non-reception of test messages at one opposite port from one direction of the ring, whereas test messages are received from the other direction of the ring at the other opposite port; and
    sending by the ring master in case of a unidirectional link failure being detected a block interface message via the opposite port that did not receive test messages.

2. The method of claim 1 further comprising the steps of:
    receiving by a network element in the ring network, the network element not being the ring master, via a first one of its ring ports the block interface message;
    evaluating, by the network element, if test messages have been received at both of its ring ports; and
    in a case where test messages have been received at both of its ring ports, blocking by the network element the first one of its ring ports for all traffic except for ring protection control traffic, or
    in a case where test messages have not been received at both of its ring ports, forwarding, by the network element, the block interface message via the second one of its ring ports.

3. The method of claim 2 further comprising the step of sending by the network element that blocked the first one of its ring ports a block interface acknowledge message to the ring master via its second ring port.

4. The method of claim 3 further comprising the step of unblocking by the ring master upon reception of the block interface acknowledge message of its previously blocked port thereby restoring connectivity of the ring network.

5. A device comprising a processor unit that is arranged such that the method steps associated with the ring master according to claim 4 are executable on said processor.

6. A communication system comprising the device according to claim 5.

7. A device comprising a processor unit that is arranged such that the method steps associated with a network element according to claim 3 are executable on said processor.

8. A device comprising a processor unit that is arranged such that the method steps associated with the network element according to claim 2 are executable on said processor.

9. A device comprising a processor unit that is arranged such that the method steps associated with the ring master according to claim 1 are executable on said processor.

10. A communication system comprising the device according to claim 9.

11. A device comprising a processor unit that is arranged such that the method steps associated with the ring master according to claim 1 are executable on said processor.

12. A communication system comprising the device according to claim 11.

13. A method of recovering from a failure in a network, the network including at least two network elements, the network elements each including at least two ports furnished for bidirectional communications, and the network elements interconnected via these at least two ports to form a ring network, wherein information can be sent both ways along the ring, and, wherein one of the network elements is a ring master, and the ring master has unblocked both of its ports connected in the ring, whereas one of the network elements in the ring not being the ring master has blocked one of its ports for reception and transmission of all traffic except for ring protection control traffic, the method comprising the steps of:
    sending, by the ring master, test messages across the ring in both directions via its two ports connected in the ring, the test messages each traveling through the ring and being received at the ring master's respective opposite port;
    detecting, by the ring master, reception of test messages from both directions of the ring;
    blocking, by the ring master, upon detection of reception of test messages from both directions of the ring, one of its ports connected in the ring for reception and transmission of all traffic except for ring protection control traffic;
    sending, by the ring master, unblock interface messages towards the network element that has blocked one of its ports for reception and transmission of all traffic, except for ring protection control traffic; and
    unblocking by the network element that has blocked one of its ports for reception and transmission of all traffic except for ring protection control traffic upon reception of the unblock interface message of the blocked one of its ports.

14. The method of claim 13 further comprising the step of sending by the network element that unblocked the blocked one of its ports an unblock interface acknowledge message to the ring master.

15. A device comprising a processor unit that is arranged such that the method steps associated with the network element according to claim 14 are executable on said processor.

16. A device comprising a processor unit that is arranged such that the method steps associated with the ring master according to claim 13 are executable on said processor.

17. A communication system comprising the device according to claim 16.

18. A device comprising a processor unit that is arranged such that the method steps associated with the network element according to claim 13 are executable on said processor.

* * * * *